Aug. 24, 1965 A. STRATIENKO 3,202,007
TOP-ENTERING MIXER DRIVE
Filed March 15, 1962 6 Sheets-Sheet 1
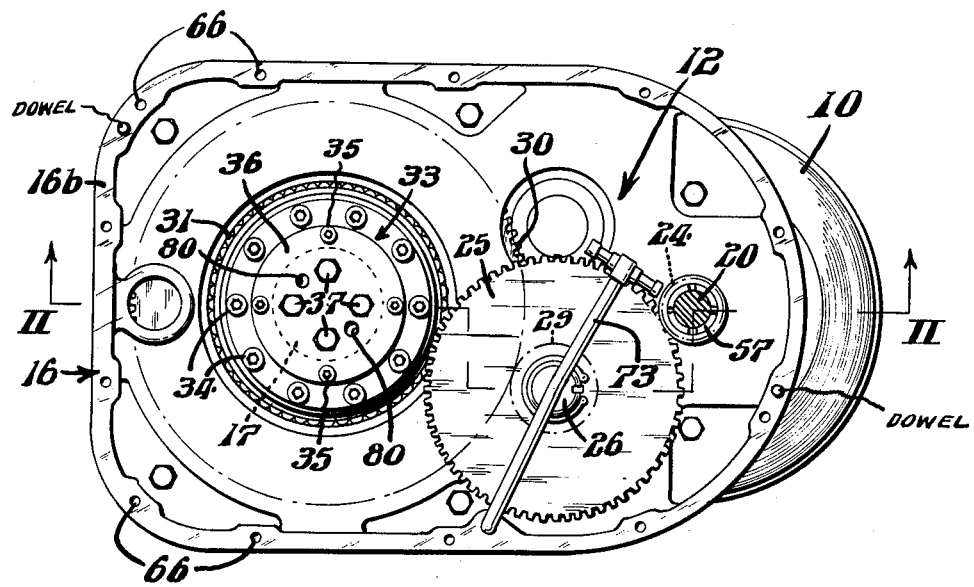
INVENTOR.
Andrew Stratienko,
BY
Paul & Paul
ATTORNEYS.

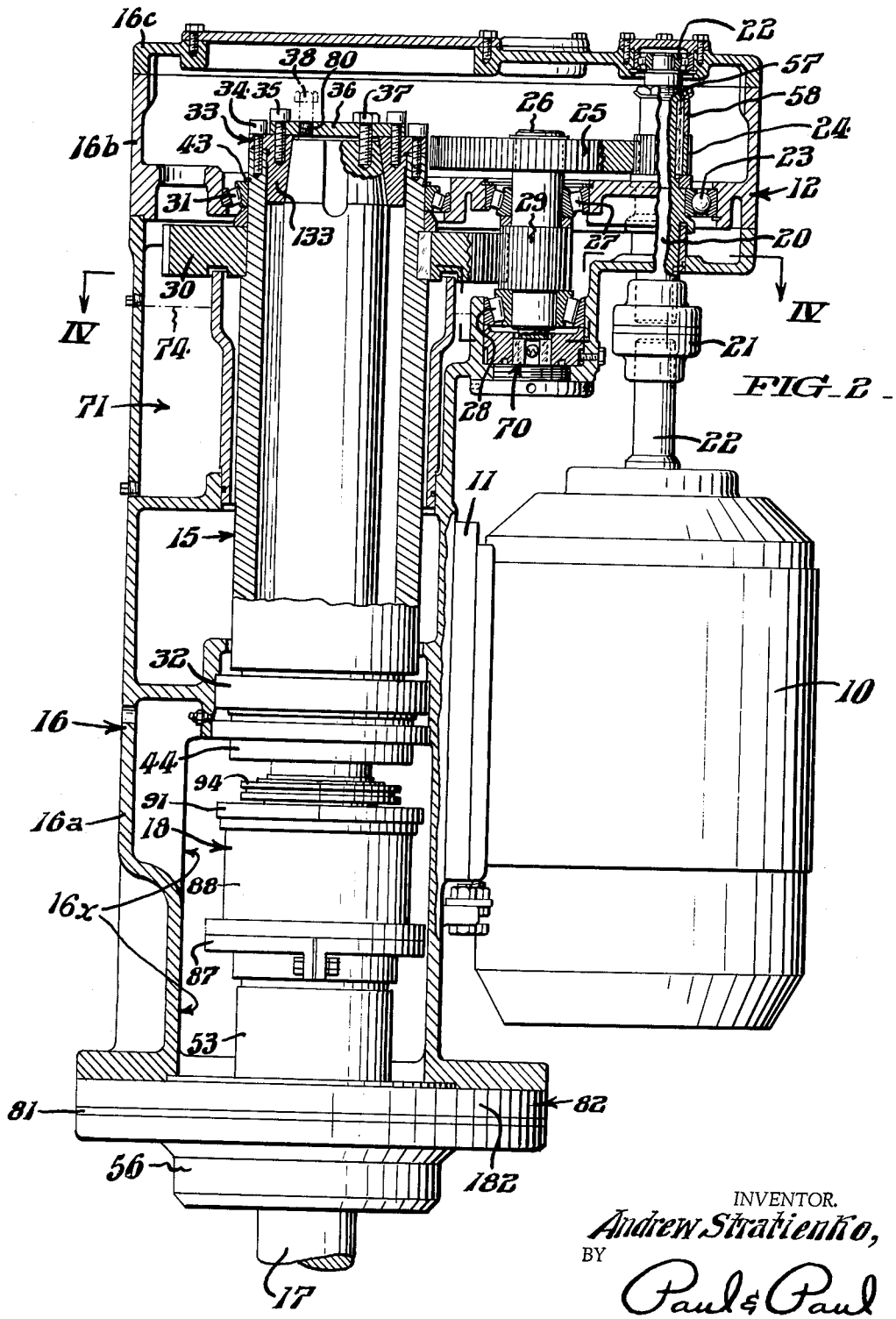
FIG_2

INVENTOR.
Andrew Stratienko,
BY
Paul & Paul
ATTORNEYS.

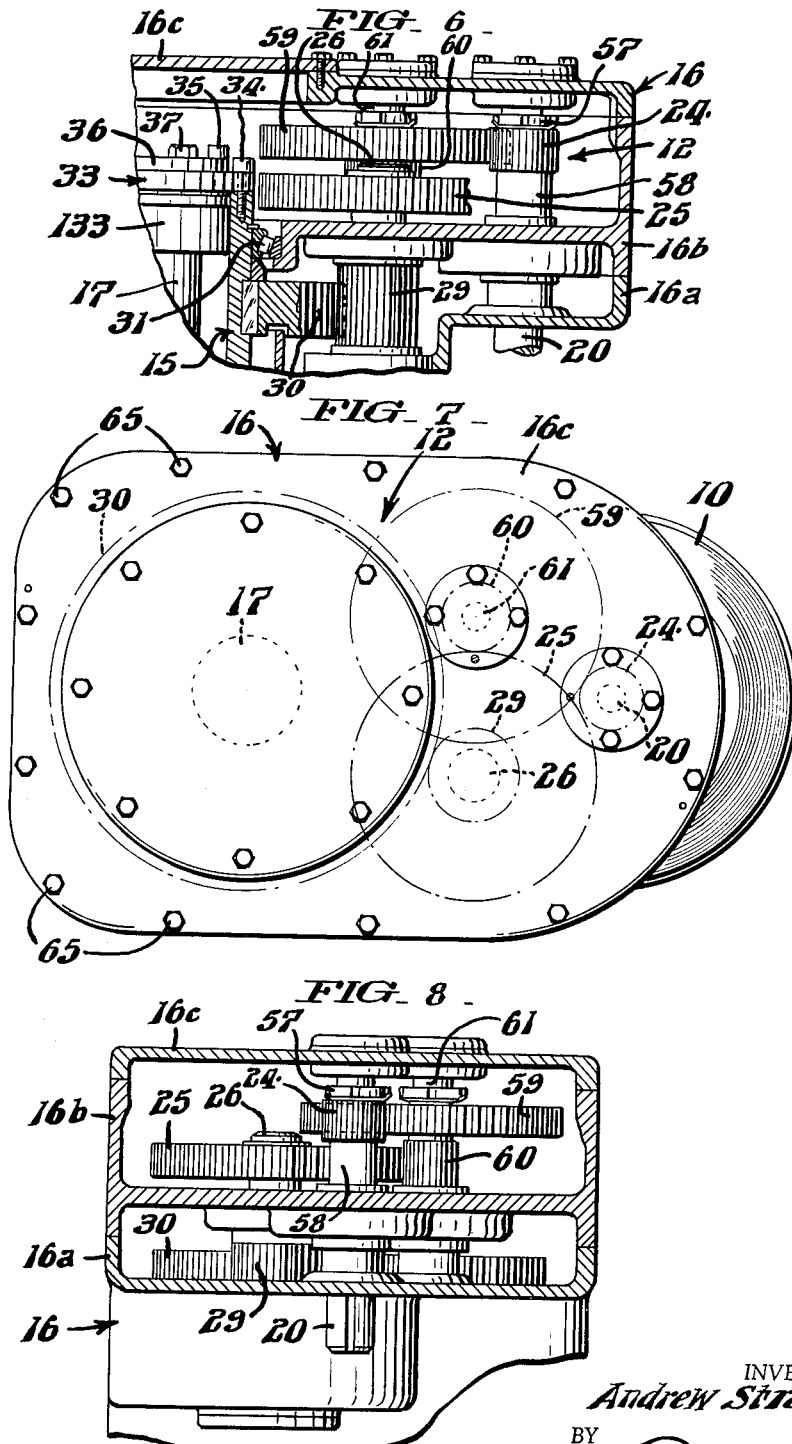

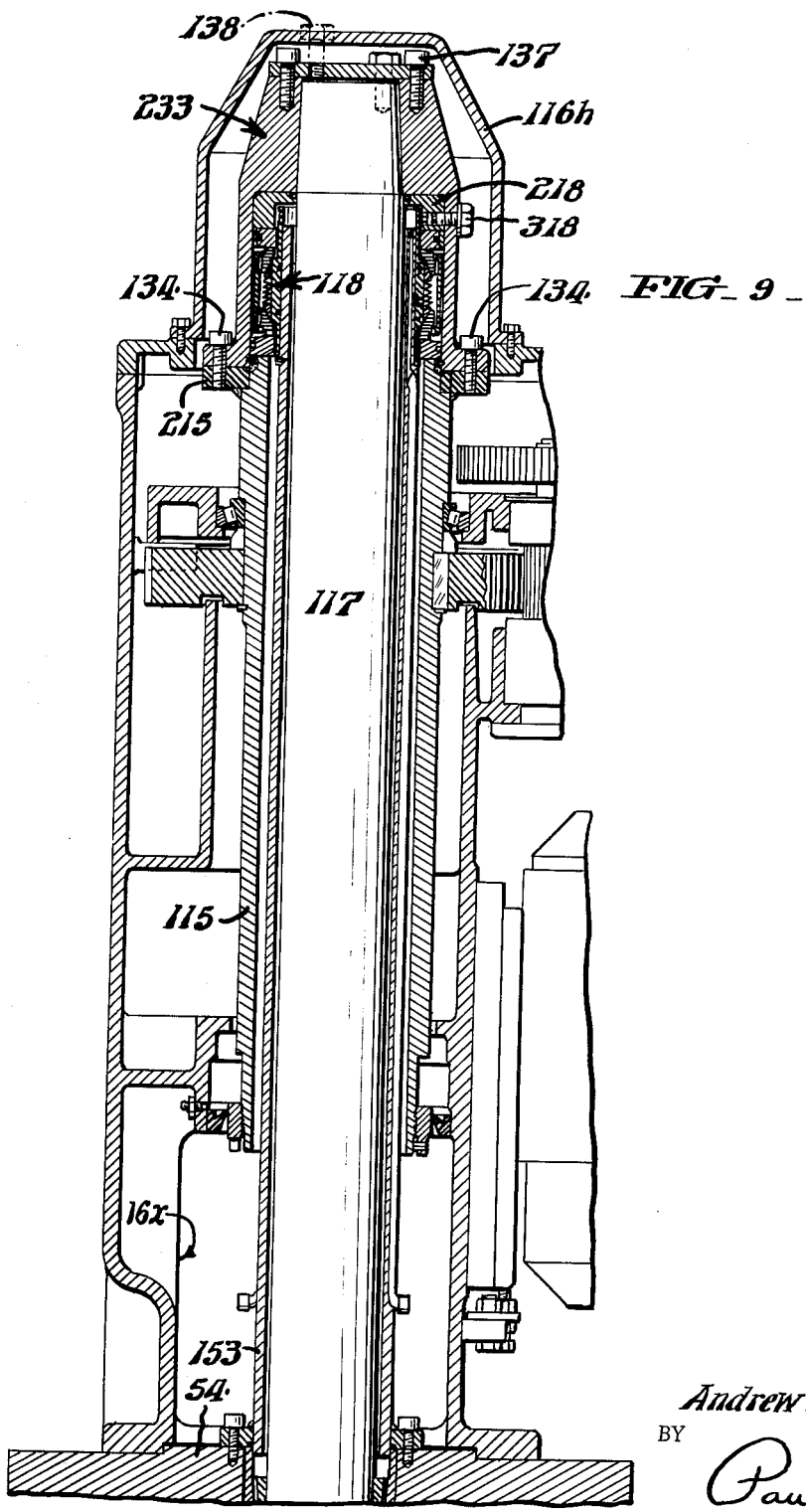

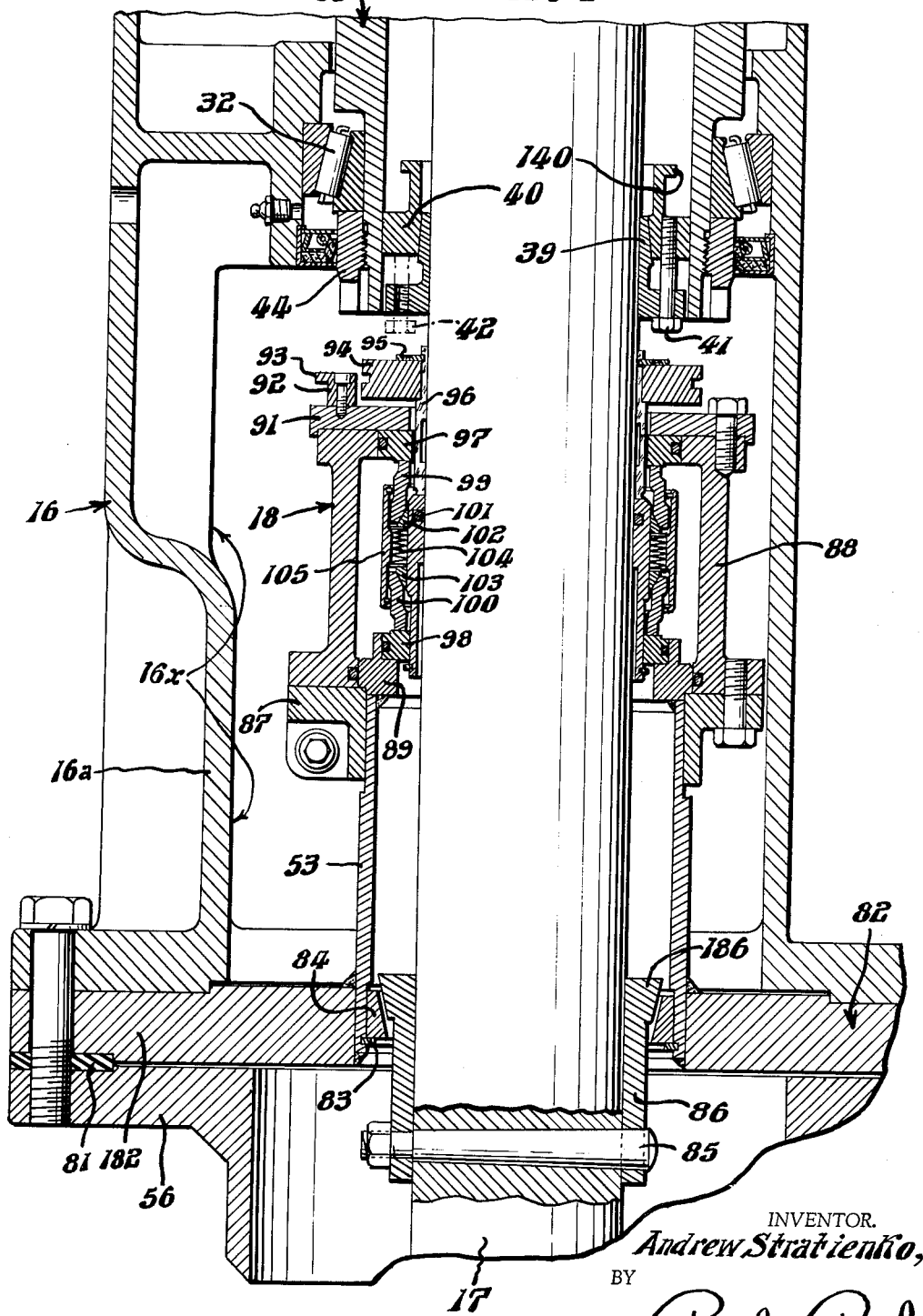

United States Patent Office 3,202,007
Patented Aug. 24, 1965

3,202,007
TOP-ENTERING MIXER DRIVE
Andrew Stratienko, Philadelphia, Pa., assignor to King of Prussia Research and Development Corporation, King of Prussia, Pa., a corporation of Pennsylvania
Filed Mar. 15, 1962, Ser. No. 179,957
6 Claims. (Cl. 74—413)

This invention relates to drive means for driving the mixing impeller shaft in a top-entering mixer.

As is well known, mixers may be classified either as top-entering or as side-entering according to whether the mixing impeller shaft enters the mixer tank through the top or through the side wall.

Side-entering impeller type mixers are used principally where very large tanks are employed, as in the petroleum industry. In such applications, the mixing impeller shaft is ordinarily merely required to be driven at constant speed and the horsepower requirements are limited as to range. That is to say, a wide range of sizes is not involved.

In top-entering mixers, however, the drive requirements are much more varied. Top-entering mixers are employed for a wide variety of purposes involving a variety of liquids. In some forms of top-entering mixers, the tank is under pressure, in which case the mixing impeller shaft must be provided with some sort of seal. In other forms, the tank is open at the top.

Where the tank is open at the top no seal is required and the drive means for the mixing impeller shaft need merely comprise a drive motor and gear reducer. Where, however, the mixer tank is closed and under pressure, a seal for the mixing impeller shaft is required and the drive means may be required to provide, in addition to a drive motor and gear reduction unit, either a stuffing box type of seal or an end-face mechanical seal.

Since top-entering mixers are used for a wide variety of purposes involving a wide variety of liquids, the requirements as to both horsepower and mixing impeller shaft sizes vary widely. In addition, space limitations in the horizontal direction may make it necessary for the drive-motor shaft to be a vertical coaxial extension of the mixing impeller drive shaft, while in other cases space limitations in the vertical direction may make it necessary that the drive-motor shaft be at right angles to the impeller shaft.

As a result of the wide range of requirements to be met by top-entering mixers, the manufacturer of drive units for top-entering mixers has heretofore had to offer a large number of different models and sizes. For example, the assignee of the present application, a manufacturer of drive units for top-entering mixers, has prior to the present invention offered a total of 76 or more different drives for top-entering mixers.

The principal object of the present invention is to provide, for a top-entering mixer, a drive which approaches universal application. That is to say, the principal object of the present invention is to provide, for a top-entering mixer, a drive which may be used for a variety of horsepower requirements, for a variety of mixing impeller shaft size requirements, for a variety of space-limitation requirements, for either open tanks or pressure tanks, and for pressure-tank usage either end-face mechanical seals or stuffing box seals.

It is a further object of the present invention to provide a substantially universal drive for a top-entering mixer in which a mixing impeller shaft seal is provided which may be readily removed for repair or replacement in the field, irrespective of whether it be an end-face mechanical seal or a stuffing box seal without leakage of liquid from the tank and without disassembly of the drive unit.

The present invention will be best understood from a consideration of the following detailed description of preferred embodiments of the present invention selected for illustration in the drawing in which:

FIG. 1 is a plan view, with cover removed, of a drive unit according to the present invention, showing a double-reduction gear reducer;

FIG. 2 is an elevational view in staggered section along the line II—II of FIG. 1 looking in the direction of the arrows;

FIG. 3 is a view, partly in section, showing a stuffing-box type of seal which may be used in place of the mechanical seal shown in elevation on the mixing impeller shaft in the lower portion of FIG. 2;

FIG. 6 is a partial view similar to the upper right portion of FIG. 2, but showing a triple-reduction gear reducer instead of the double-reduction reducer shown in FIG. 2;

FIG. 7 is a plan view similar to that of FIG. 1, but showing the triple-reduction gear reducer instead of the double-reduction reducer shown in FIG. 1;

FIG. 8 is a view similar to FIG. 5, but showing the triple-reduction gear reducer instead of the double-reduction unit shown in FIG. 5;

FIG. 9 is an elevational view in section showing a modified drive unit in which, for reasons to be discussed later, the mixer shaft sealing means has been moved from the bottom of the mixer drive assembly, or tank top level, to a position near the top of the drive; and FIG. 10 is an enlarged elevational view, partly in section, of the end-face mechanical seal 18 shown in FIG. 2.

Figure 4:
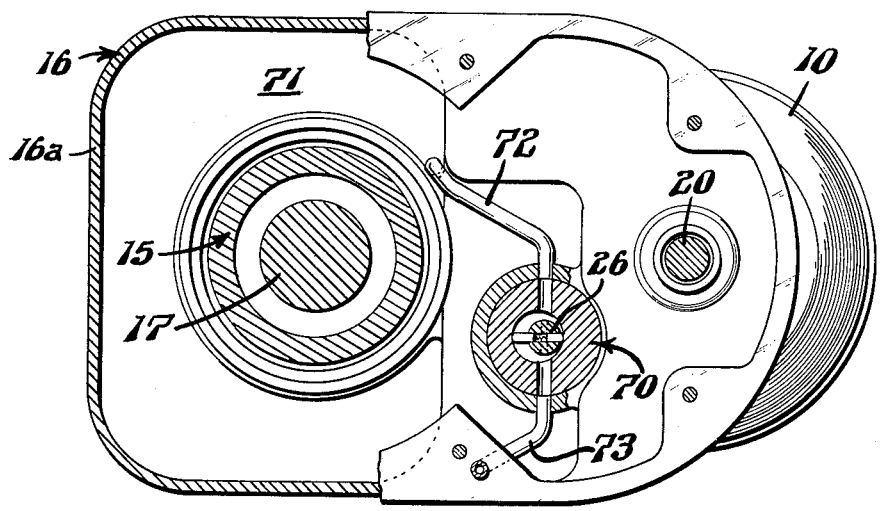
FIG. 4 is a top view in staggered section along the line IV—IV of FIG. 2.

In the detailed description which follows, specific terms are used. It is to be understood, however, that each specific term includes all technical equivalents which operate in a similar manner to accomplish a similar purpose.

Referring now to FIGS. 1 and 2 of the drawing, the drive means for the mixing impeller shaft comprises essentially a housing adapted for mounting a drive motor 10 on its exterior surface, a gear reducer unit 12 within the housing adapted to be coupled to the motor drive shaft, a hollow tube or quill 15 in the housing adapted to be driven by the gear reducer, the quill 15 being adapted to be connected to a mixing impeller shaft 17 inserted therein. Neither the motor 10 nor the mixing impeller shaft 17 are part of the universal drive unit, as claimed herein and as offered for sale by the manufacturer. However, the motor 10 and the mixing impeller shaft 17 are both included in FIG. 2 of the drawing to illustrate the manner in which the motor and shaft are connected to the drive unit of the present invention.

An end-face mechanical type seal identified comprehensively by the reference numeral 18 is provided for the mixing impeller shaft 17 and is illustrated in elevation in FIG. 2 and in enlarged section in FIG. 10. A stuffing-box type of seal 48 is shown in FIG. 3. A top-of-drive seal, shown as an end-face mechanical seal, is illustrated in FIG. 9. One of such types of seals is necessary where the top-entering mixer is of the pressure type, but no seal is necessary if the mixer be of the open-top type.

The gear reduction unit 12, the drive quill 15, and the seal, if any, are mounted within the housing 16. The motor 10 is mounted on the exterior of the housing 16. The housing 16 is relatively long vertically with a short transverse portion at the top.

Housing 16 is shown to be comprised of three sections, a lower section 16a comprising the long vertical portion and support for the transverse portion, a middle section 16b comprising most of the transverse portion, and a cover section 16c. In the case of a top-of-drive type seal, the cover section 16c is provided with a hood 116h, as shown in FIG. 9, for covering those parts which extend above the level of the cover 16c. The major portion of the gear-reduction unit 12 is in the middle housing 16b, just below the cover 16c.

Motor 10 may be a standard foot-mounted type of motor mounted on an adapter plate 11 secured to the side of the lower housing 16a below the overhanging transverse portion. Motor 10 may be any one of a relatively large number of sizes. The motor drive shaft 22 is maintained coaxial with the input shaft 20 of the gear-reduction unit irrespective of motor size, by selecting the proper size of adapter plate 11. The motor shaft 22 is connected through a flexible coupling 21 to the input shaft 20 of the gear reduction unit.

Input shaft 20 is supported by two bearing means 22 and 23. Bearing 22 at the top of the shaft takes the radial load while the lower bearing 23 takes both the axial and radial thrust.

Slidably keyed on input shaft 20 between the bearings 22 and 23 is the high-speed pinion 24. A bushing 58 and a lock-nut 57 hold the pinion 24 in mesh with a change gear 25. Change gear 25 is keyed to the upper end of the low-speed pinion shaft 26. Secured to shaft 26, below change gear 25, is the low-speed pinion 29. Shaft 26 is supported both above and below the low-speed pinion 29 by the roller bearings 27 and 28. These bearings take both the axial and radial thrusts.

The arrangement just described is adapted to function as a double-reduction gear reducer.

Low-speed pinion 29 meshes with low-speed gear 30 keyed to the hollow tube or quill 15. Quill 15 is vertically supported for rotation in housing 16 by an upper bearing 31 and a lower bearing 32. Upper bearing 31 is held in place by a snap ring 43 while lower bearing 32 is supported by a threaded collar 44 screwed onto the externally-threaded lower end of quill 15.

At its upper end, quill 15 is provided with an annular adapter 33 having a flange portion abutting the end of the quill 15 and a depending portion 133 adapted to fit into the bore of the quill. Depending portion 133 has a tapered bore adapted to be force fitted over the tapered end of the mixing impeller shaft 17. The adapter 33 is secured to the upper end of quill 15 by a plurality of screws 34 inserted through holes equally spaced about the flange of the adapter 33.

The depending portion of adapter 33 is provided with a plurality of threaded holes for receiving the screws 35 for securing a disk cap 36 to the adapter 33. Cap 36 is also provided with a plurality of holes through which screws 37 are inserted into threaded holes provided in corresponding positions in the tapered end of the mixing impeller shaft 17. Cap 36 is further provided with threaded holes 80 into which eject screws 38 may be inserted for breaking the tight fit between the impeller shaft 17 and the adapter 33 when the drive means is to be removed from the shaft 17. Quill 15 is adapted to accommodate impeller shafts of different diameters, and for the different size impeller shafts different adapters 33 and different caps 36 may be used having holes differently positioned for receiving the fastening screws 37 and the eject screws 38.

As shown in the enlarged sectional view in FIG. 10, radial support for impeller shaft 17 at the lower end of quill 15 is provided by a split adapter sleeve 39 and a split annular wedge 40. Wedge 40 is adapted to be wedged between the sleeve 39 and the quill 15 by a plurality of screws 41 spaced about the shaft. A number of eject screws 42 are provided for breaking the tight fit of the wedged members 39 and 40 when the shaft 17 is to be removed from the quill. It will be understood that for shafts having different diameters than shaft 17, different sizes of sleeves 39 and of wedges 40 are used.

For the purpose of removing the wedge 40 and sleeve 39 conjointly as a preliminary step in the removal, for replacement or repair, of the end-face mechanical seal 18, as will be described, the wedge 40 is provided with an upper outwardly extending flange 140 adapted to be grabbed by one or more long-handled hooks (not shown) which are insertable, after removal of cap 36 and adapter 33, into the annular space between the quill 15 and the mixing impeller shaft 17.

To prevent liquid, or vapors, or gases, under pressure in the tank from escaping up the shaft 17, the mechanical seal 18 may be provided, shown in elevation in FIG. 2 and in enlarged section in FIG. 10. Alternatively, a stuffing-box seal 48 may be provided, as shown in FIG. 3.

In a stuffing-box seal, such as seal 48 of FIG. 3, there is rubbing contact between the surface of the shaft and the packing material 49 which is pressed, as by sleeve ring 50, into the annular space about the shaft formed by the collar 51.

In a mechanical seal, on the other hand, such as seal 18 of FIG. 2, the rubbing motion is between highly polished flat seal ring faces in a plane perpendicular to the shaft axis. These faces are so mounted that the required contact pressure is maintained during operation. The details of the mechanical seal 18 is shown in FIG. 10 and will be but briefly described since such form of seal is well known and commercially available.

Referring now to FIG. 10, the reference numeral 56 represents the flange of a tank to which the mixing impeller drive means of the present invention is to be attached. For the purposes of the present discussion, the tank may be assumed to be a closed tank, intended to be completely sealed from atmosphere and to be operated under pressure. Fitted onto the tank flange 56 and separated therefrom by a sealing gasket 81 is a mounting flange 82 comprising a horizontal portion 182 having a circular hole therethrough and having welded thereto at the edge of the hole an upstanding annular support flange 53 through which the mixing impeller shaft 17 is adapted to pass into the tank. Secured, as by welding, to the upper edge of upstanding flange 53 is a seal gland 89 which serves to support the sealing components of the end-face mechanical seal 18. Supported by flange 53 near its lower end, as by a split ring 83 disposed in an annular slot in its inner surface, is an annular wedge-shaped member 84, the function of which is to support the mixing impeller shaft 17 when the shaft 17 is not being driven rotationally and is disconnected from its primary support at its upper end, as will be explained. Secured to shaft 17, as by a pin or bolt 85 located below the mounting flange 82, is a collar 86, the upper end of which has an outstanding wedge-shaped portion 186 adapted to engage in a complementing manner with the wedge-shaped member 84.

In operation, shaft 17 is supported from the top by means of adapter 33, cap 36, and screws 37, as seen in FIG. 2. When the shaft 17 is so supported, the wedge portion 186 of collar 86 is above and out of engagement with wedge member 84, as shown in the illustration in FIG. 10. However, when it is desired to remove the end-face mechanical seal 18 (FIG. 10) or the stuffing-box seal 48 (FIG. 3) or the top-of-drive seal 118 (FIG. 9), the top support of shaft 17 is disconnected and shaft 17 is forced downward by the eject screws 138 to break the forced fit. The shaft 17 drops and the inclined surface of wedge portion 186 comes into tight engagement with the complementing inclined surface of wedge member 84. By those means, the shaft 17 is supported during initial installation and at the other non-operating times, as during seal repair or replacement.

The housing 16 of the drive unit of the present invention is flanged at its lower end and adapted to be placed upon and bolted to the mounting plate 82 and tank flange 56 in the manner shown in FIG. 10. In the lower region of the housing 16, at the level of the end-face mechanical seal 18 (FIG. 10) or the stuffing-box seal 48 (FIG. 3), the peripheral wall of the housing 16 is provided with opposed access openings 16x of sufficient size to permit a workman to install or remove those split parts which provide the support for the end-face mechanical seal 18 (or the stuffing-box seal 48), and which split parts must be installed or removed in connection with the repair or replacement of the seal.

As shown in FIG. 10, the upstanding flange 53 has a recessed portion at its upper end for receiving the split support ring 87 to which is bolted the split housing 88 of the end-face mechanical seal 18. Bolted to the upper face of seal housing 88 is a split support ring 91, the function of which is to supoprt or retain, against the upward pressure of the tank liquids, vapors, or gases, the sealing components of the end-face mechanical seal 18. Secured to the upper face of support ring 91 is a positioning block 92 having an upper outstanding flange 93 which (when the positioning block is rotated 180° from the position shown in FIG. 10), is adapted to enter the peripheral groove of a split collar 94. Split collar 94 is retained in place in a recessed end portion of drive sleeve 96 by a snap ring 95 which is adapted to fit into an annular groove in the upper part of drive sleeve 96 of the mechanical seal. Snap ring 95 is provided with threaded holes, the axes of which are parallel to the axis of shaft 17. These threaded holes are employed in the removal of the end-face mechanical seal, as will be described.

Drive sleeve 96 is split several times in its upper region, i.e., above a point located just above the O-ring gasket 101, but is not split therebelow. The purpose of having drive sleeve 96 split in its upper portion is to lend flexibility to the sleeve to facilitate its installation onto and its removal from the shaft 17.

Clamped between the seal gland 89 and the split support ring 91 is the mechanical seal per se comprising, in addition to drive sleeve 96, the upper and lower seal seats 97 and 98, the upper and lower seal rings 99 and 100, the upper and lower wedges 102 and 103, the compression spring 104, and the retaining collar 105.

Of the parts mentioned above, some rotate with the shaft 17 while others remain stationary. Those parts which rotate with the shaft include drive sleeve 96, O-ring gasket 101, seal rings 99 and 100 (commonly carbon), wedges 102 and 103 (usually Teflon), compression spring 104, retaining collar 105, split collar 94 and snap ring 95. The stationary parts include split support ring 87, seal housing 88, seal gland 89, upper and lower seal seats 97 and 98, and split support ring 91. The positioning block 92 does not rotate with shaft 17 but is rotatable on its own axis. In FIG. 10, positioning block 92 is shown in the position which it occupies when the drive shaft is rotating or ready for rotation. During installation and adjustment of the end-face mechanical seal, the positioning block 92 is rotated 180° so that the flange 93 enters into the peripheral groove in the split collar 94.

When shaft 17 is rotating, the rubbing surfaces of the end-face mechanical seal are the lapped faces of the rotating carbon seal rings 99, 100 against the stationary seal seats 97, 98.

To remove the end-face mechanical seal as for replacement or repair, the workman, using the access slots 16x previously referred to in the housing 16 of the drive unit, removes (if necessary) the snap ring 95 from its groove in sleeve 96, then removes the split collar 94, the split supporting ring 91, the split support ring 87, and the split seal housing 88. He then loosen the bolts 41 which hold the annular wedge 40 in tight wedging engagement with adapter sleeve 39 and uses the eject screws 42 to break their tight engagement. The screws 37 at the top of shaft 17 are next removed and eject screws 38 are turned inward to break the tight fit between the shaft 17 and the adapter 33. This moves shaft 17 slightly downward and causes the wedge-shaped flange 186 of collar 86 to come into wedging engagement with the wedge support member 84. Thus, with the drive means disconnected, i.e., with the shaft 17 disconnected from the supporting means at the top of the shaft, shaft 17 is supported by the mounting flange 82 and the tank flange 56.

When shaft 17 drops down as just described, the mechanical seal is prevented from moving downward by the seal gland 89, and thus the mechanical seal is slightly moved upward relative to the shaft 17.

Cap 36 and adapter 33 at the top of the shaft are next removed exposing the annular space between the quill 15 and shaft 17. Into this annular space, one or more long-handled hooks are lowered and hooked under the flange 140 of annular wedge 40. The loosened but still connected wedge members 39, 40 are then pulled up as a unit and removed from over the end of the shaft. Next, snap ring 95 (if removed from its groove) is replaced on the shaft 17 in its groove at the upper of drive sleeve 96, and two (or more) long-handled rods (not illustrated) with threaded end portions, are lowered into the annular space on opposite sides of the shaft 17 and screwed into the threaded holes provided in the snap ring 95. The endface mechanical seal 18 exclusive of its housing 88 but including the drive sleeve 96, the O-ring gasket 101, the snap ring 95, the seal seats 97, 98, the seal rings 99, 100, the compression spring 104, and the retaining collar 105, is then pulled up along the shaft 17 through the annular space between the shaft 17 and the quill 15, and removed as a unit from over the end of the shaft. It will be seen, then, that the end-face mechanical seal is removable for replacement or repair without removing or disassembling the drive unit of the present application.

Referring now to the gear reduction unit illustrated in FIG. 2 and described above, this unit is adapted to accomplish a double reduction in speed. Variations within rather wide limits from double reduction may be made by changing the gear ratio in either or both of two sets of gears, without disassembling the drive unit. The two sets of gears just referred to are, first, the pinion 24 and the gear 25, and, second, the pinion 29 and the gear 30. To change, for example, the pinion 24 and gear 25, you merely remove the screws 65 (FIG. 7) from the holes 66 (FIG. 1) and take off the cover 16c of the housing. When the cover of the housing is removed, the outer race portion of bearing 22 is removed also. The locknut 57 and the bushing 58 are next removed from unput shaft 20, after which the keyed pinion 24 is slid up and off the end of the shaft 20. Then gear 25 on shaft 26 is removed, and gear 25 and pinion 24 are replaced by gears having different ratio. The pinion 29 and gear 30 of the second set of gears are removed with similar ease.

To achieve a greater reduction in speed, the double-reduction gear reduction unit is replaced with a triple-reduction unit. Such a unit is illustrated in FIGS. 6, 7, and 8. In the triple-reduction unit, an additional set of gears is employed, specifically an intermediate change gear 59 and an intermediate pinion 60. These gears 59 and 60 are secured to an additional shaft 61, the position of which relative to the high-speed pinion shaft 20 and low-pinion shaft 26 is seen most clearly in FIG. 7.

Before inserting the additional shaft and gears of the triple-reduction unit, the high-speed pinion 24 and bushing 58 are interchanged in position on input shaft 20 relative to the positions which they occupy in the double-reduction unit. Specifically, the high-speed pinion 24 is placed on shaft 20 above rather than below bushing 58. In this upper position, pinion 24 meshes with the intermediate change gear 59 secured to the additional shaft 61. Also secured to shaft 61, as seen clearly in FIG. 8, is the intermediate pinion 60 which meshes with the low-speed change gear 25 keyed to low-speed shaft 26. Also secured to low-speed shaft 26 is low-speed pinion 29 which meshes with driven gear 30 keyed to the quill 15. As in the case of the double-reduction unit, variations within rather wide limits may be made in the triple-reduction unit, without disassembling the drive unit, by changing the ratio of one or more of the gear sets. The ability to change from double to triple reduction, or vice versa, and the ability to change gear ratios, in each case without disassembling the drive unit, are among the important advantages of the universal drive unit of the present application.

Figure 5:
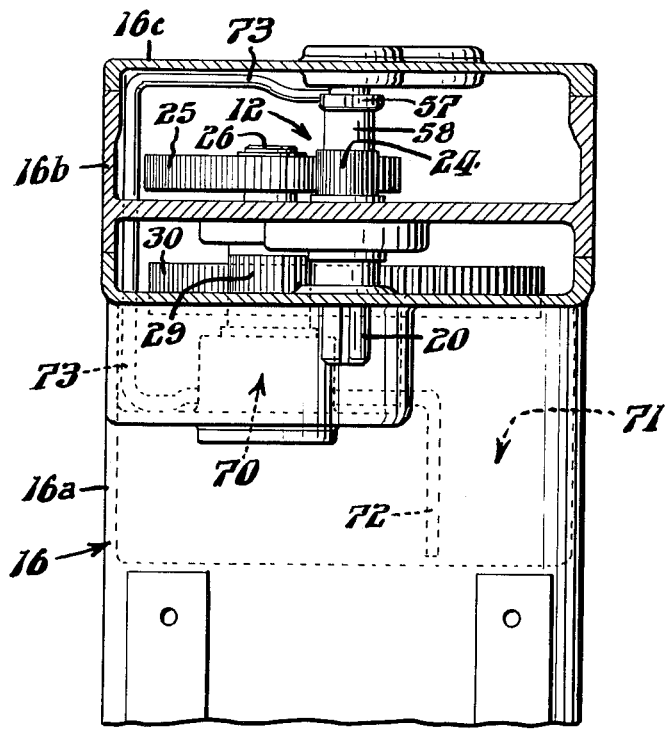
FIG. 5 is a view looking to the left at the upper part of FIG. 2 with part broken away and with the motor removed.

Lubrication for the gears of the drive unit is provided by a vane-type fluid motor 70 driven by the low-speed shaft 26 as shown in FIGS. 2, 4, and 5. Fluid motor 70 sucks oil from well 71 through the line 72 and pumps it out the line 73 from which it is sprayed upon the various gears. The oil is then returned to the well 71 through the various passageways. The oil level in well 71 is indicated in FIG. 2 by the dot-and-dash line 74.

The drive unit illustrated in the drawing and described hereinabove has a number of advantages over prior art drive units. Some of these advantages have already been mentioned. The most important advantage is that the new drive unit approaches being a universal drive since (a) it is adapted to be driven by motors of a range of different sizes, (b) it is sufficiently compact to meet most space-limitation requirements in both the axial and radial directions, (c) it is adapted to drive impeller shafts having a wide range of different sizes and of different materials, (d) it is adapted to provide a wide range of shaft speeds, and (e) it is adapted to use an end-face mechanical seal, or a stuffing-box seal, or no seal at all.

Another advantage is that the seal, whether it be a stuffing-box seal or an end-face mechanical seal, may be removed and replaced in the field. The manner of removing the end-face mechanical seal has already been described in some detail.

Another advantage is that the gear reduction unit is readily adapted to be changed in the field from double to triple reduction, or vice versa. Or, the gear ratio may be changed in the field.

Another feature is that both the high-speed and low-speed pinion shafts 20 and 26 are supported by bearings both above and below the pinions, whereas in most prior art arrangements, the reduction gearing shafts are supported only at one end. This is deemed an important feature of the new design.

Another advantageous feature is that the propeller shaft 17 is supported at only two bearing points 31 and 32, instead of at three. The disadvantage of three bearing points is, of course, the difficulty of aligning the three points. Yet prior-art constructions required three bearing points in order to provide the axial stability required for an end-face mechanical seal. In the construction design described in the present application, the end-face mechanical seal 18 is located sufficiently close to the bearing 32 to make a third bearing unnecessary.

Another advantage is that the drive unit shown and described has the ability to take a large external load. For example, where the tank is operating under high internal pressure, there is a large upward thrust on the mixing impeller drive shaft 17. This thrust, in the design shown in the present application, is upward on the roller bearings 32 via the wedge members 39, 40, and then outward and downward on the housing 16. By this means, the upward thrust is kept away from the reducer gearing. This is an important feature.

There is, of course, also a radial thrust on the mixing impeller shaft 17 caused by the load on the impeller. The radial thrust on the shaft 17 is on the lower roller bearings 32 through the wedge members 39, 40 and on the upper roller bearings 31 through portion 133 of adapter 33. There is but very little load on quill 15 due to the proximity of the bearings to the load transfer elements, i.e., the proximity of lower bearings 32 to the wedge members 39, 40, and the proximity of upper bearings 31 to the adapter part 133. The design feature which prevents quill 15, and hence the reducer gearing, from carrying much of the radial load is another important feature of the drive unit of the present application.

For certain applications and conditions, the drive structure may be modified to accommodate the mixing shaft sealing means at the top of the drive, rather than near the bottom of the drive at the tank top level. Such a modified drive unit showing a top-of-drive end-face mechanical seal, is illustrated in FIG. 9.

The top-of-drive or top-of-shaft type of seal is of major benefit where the physical or chemical conditions at the tank top make effective shaft seal operation difficult, or when problems of toxicity or accessibility make it desirable to do maintenance work on the shaft seal at the top of the mixer drive unit. To make the arrangement practical in operation, a stationary tube must extend upward between the hollow drive quill and the mixing impeller shaft to a point at or above the shaft sealing means. Since this tube is exposed to the mixing tank liquids and vapors, it must be of appropriate corrosion-resistant material.

Referring now to FIG. 9, it will be seen that a tube 153 is provided which extends up the shaft all the way to a point above the upper end of quill 115. Tube 153 is mounted on and supported by a mounting flange 54 comparable to mounting flange 82 of FIGS. 2 and 10. Quill 115 is provided at its upper end with a flange 215 for receiving in abutting relation the flange of an adapter 233. Screw holes and screws 134 are provided for securing the two flanges together. An end-face mechanical seal 118 is supported upon the upper end of quill 115 and is retained at its upper end by a retaining plate 218. The upper portion of adapter 233, above the plate 218, is generally similar to adapter 33 of FIG. 2 and need not be further described.

The top-mounted end-face mechanical seal 118 of FIG. 10 surrounds the tube 153. A snap ring supports the sleeve of the seal on the tube 153. The upper seal seat is retained by the retaining plate 218 while the lower seal seat is supported by the quill 115. The upper and lower seal rings make rubbing contact with the upper and lower seal seats respectively. The parts which rotate with the shaft 117 include the seal seats, the retaining plate 218, the adapter 233, and, of course, the quill 115. The parts which remain stationary include the seal rings and the seal sleeve. A hood 116h covers the seal and adapter structures.

To remove the top-mounted mechanical seal 118 for repair or replacement, the hood 116h is removed, the screws 318, 134 and 137 are extracted, the eject screws 138 are turned downward to break the tight fit between the adapter 233 and the shaft 117, and the adapter 233 and support plate 218 are removed. The end-face mechanical seal 118 is then slid upward and off the tube 153.

While the preferred embodiments of this invention have been described in some detail, it will be obvious to one skilled in the art that various modifications may be made without departing from the invention as hereinafter claimed.

Having described my invention, I claim:

1. A drive for a top-entrance mixer tank having internal pressure, said drive comprising a housing having a vertical portion adapted for mounting on the top of said tank over said top entrance; a hollow cylindrical quill mounted for axial rotation in said housing; drive means for driving said quill rotationally; a cylindrical tubing mounted on the top of said tank surounding said top entrance and extending upwardly in coaxial alignment with said quill for extending the tank pressure to a level above the tank top and within said housing; annular sealing means at the upper end of said tubing for sealing said tank pressure; adaptor coupling means disconnnectably secured to the upper end of said quill and connectable to the upper end of a unitary impeller shaft insertable downwardly through said coaxially aligned quill, tubing and top entrance of said tank, said shaft when fully inserted extending above said quill; and auxiliary lower support means for supporting the inserted shaft when said adaptor coupling means is removed, said sealing means being removable as a unit, when said adaptor coupling means is removed, by moving said sealing means axially upward with respect to said shaft and over the upper end thereof.

2. Apparatus as claimed in claim 1 characterized in that said tubing extends upward within said housing to a point below the lower end of said quill, and further characterized in that tubing supports said sealing means, and that said sealing means encompasses said shaft below the lower end of said quill and includes connecting means to allow removal of said sealing means, when said adaptor coupling means is removed, by pulling said sealing means as a unit slidingly upward along said shaft through the annular space between said shaft and said quill.

3. Apparatus as claimed in claim 1 characterized in that said tubing extends upwardly within said quill to a point above the upper end of said quill, and further characterized in that the sealing means is located above the upper end of said quill and is removable, when said adaptor coupling means is removed, by pulling upwardly and over the upper end of said shaft.

4. Apparatus as claimed in claim 2 further characterized in that removable annular wedge means are provided near the lower end of said quill in the annular space between said shaft and said quill for providing radial support to said shaft.

5. Apparatus as claimed in claim 4 further characterized in that said quill is provided with bearing means at only two points, one near the upper end of said quill close to said adapter coupling means and the other near the lower end of said quill close to said annular wedge means.

6. Apparatus as claimed in claim 5 further characterized in that said bearing means close to said adapter coupling means are inclined for taking the upper radial thrust of said shaft, and in that said bearing means close to said annular wedge means are inclined for taking both the upward thrust of said shaft and also the radial thrust.

References Cited by the Examiner
UNITED STATES PATENTS

| | | | |
|---|---|---|---|
| 2,882,075 | 4/59 | Biering et al. | 277—62 |
| 2,921,805 | 1/60 | Shevchenko | 277—62 |
| 2,922,383 | 1/60 | Oestreicher | 74—413 |
| 2,945,711 | 7/60 | Dykman | 277—9 |
| 2,974,538 | 3/61 | Jennings | 74—413 |
| 3,115,333 | 12/63 | Lennon | 277—9 |

DON A. WAITE, *Primary Examiner.*

BROUGHTON G. DURHAM, *Examiner.*